United States Patent
Bredolt et al.

(10) Patent No.: US 6,285,727 B1
(45) Date of Patent: *Sep. 4, 2001

(54) NUCLEAR PLANT

(75) Inventors: Ulf Bredolt, Västerås; Johan Engström, Stockholm; Bengt Ivung, Västerås, all of (SE)

(73) Assignee: ABB Atom AB, Vasteras (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/355,424

(22) PCT Filed: Mar. 6, 1998

(86) PCT No.: PCT/SE98/00407

§ 371 Date: Sep. 15, 1999

§ 102(e) Date: Sep. 15, 1999

(87) PCT Pub. No.: WO98/39779

PCT Pub. Date: Sep. 11, 1998

(30) Foreign Application Priority Data

Mar. 7, 1997 (SE) .................................................. 9700823

(51) Int. Cl.[7] .................................................. G21C 15/18
(52) U.S. Cl. ........................... 376/282; 376/280; 376/283
(58) Field of Search .................................... 376/280, 283, 376/282

(56) References Cited

U.S. PATENT DOCUMENTS

| 4,210,614 | * | 7/1980 | Kleimola | 261/124 |
| 5,057,271 | * | 10/1991 | Turricchia | 376/280 |
| 5,080,857 | * | 1/1992 | Miller et al. | 376/280 |
| 5,307,390 | * | 4/1994 | Gou et al. | 376/280 |
| 5,315,625 | * | 5/1994 | Turricchia | 376/280 |
| 5,343,505 | * | 8/1994 | Serviere | 376/280 |
| 5,343,506 | * | 8/1994 | Artnik et al. | 376/280 |
| 5,596,613 | * | 1/1997 | Gluntz et al. | 376/283 |
| 5,703,917 | * | 12/1997 | Hau et al. | 376/280 |
| 5,867,548 | * | 2/1999 | Bittermann et al. | 376/280 |

FOREIGN PATENT DOCUMENTS

| 30 36 232 | | 5/1982 | (DE) . | |
| 2435-784 | * | 5/1980 | (FR) | G21C/9/00 |
| 406265675 | * | 9/1994 | (JP) | G12C/9/016 |
| 428 611 | | 7/1983 | (SE) . | |
| WO 92/11642 | * | 7/1992 | (WO) | G21C/15/18 |
| WO 94/29875 | * | 12/1994 | (WO) | G21C/9/016 |
| WO 94/29876 | * | 12/1994 | (WO) | G21C/9/016 |
| WO 96/20486 | * | 7/1996 | (WO) | G21C/9/02 |

* cited by examiner

Primary Examiner—Charles T. Jordan
Assistant Examiner—J. A. Richardson
(74) Attorney, Agent, or Firm—Connolly Bove Lodge & Hutz

(57) ABSTRACT

A nuclear reactor plant with a light water reactor comprises a containment (1) having an upper space (2) and a lower space (3). The lower space is separated from the upper space by a separating member (4) and arranged to house a cooling medium (16). Furthermore, the plant comprises a reactor vessel (9) housing a reactor core (10) and provided in the upper space (2). The separating member (4) comprises a portion (7) which is arranged to be located at such a position that the surface portion (7) facing the lower space (3) is in contact with the cooling medium (16). The reactor vessel is provided above the portion (7).

11 Claims, 1 Drawing Sheet

NUCLEAR PLANT

BACKGROUND OF THE INVENTION AND PRIOR ART

The present invention relates to a nuclear reactor plant with a light water reactor, comprising a containment having an upper space and a lower space, which is separated from the upper space by a separating member and which is arranged to house a cooling medium, and a reactor vessel housing a reactor core and provided in the upper space.

Such nuclear reactor plants are known and these have proved to function in a satisfactory manner. However, if the reactor core for any reason would reach such a temperature that the fuel starts to melt and the geometry of the core is changed, it might happen that the core may fall down from its original position and penetrate the bottom of the reactor vessel, i.e., a so-called core melt. In this case, the core will fall down onto the bottom surface of the containment. As long as the containment is intact and the core may be maintained within the containment, there is no real risk that radioactivity in any greater amount will leak to the environment. However, if the core would melt through the containment, the risk for such a leakage is imminent.

Different measures have been-proposed in order to avoid this risk. One such measure is to sprinkle cooling liquid over the core located on the bottom surface. However, such a cooling from above may prove to be insufficient, during a longer period of time, to prevent in a secure manner any part of the core from penetrating the containment. Another measure proposed is to let the core fall down into a water pool provided beneath the reactor vessel. A further measure, which has been proposed, is to let the core fall down into a container having double walls between which a cooling medium circulates to cool down the core.

SUMMARY OF THE INVENTION

The object of the present invention is to provide a way to take charge of a core which has fallen down through the bottom of the reactor vessel in such a manner that the risk of radioactive emissions to the environment may be further reduced.

This object is achieved by the reactor plant initially defined and characterized in that the separating member comprises a portion which is arranged to be located at such a position that the surface of the portion facing the lower space is in contact with the cooling medium, and that the reactor vessel is provided above the portion. By such a design of the reactor plant, which enables the feature that the portion is submerged in a cooling medium, the core at a possible core melt will fall down onto the portion. Thereby, the following essential advantages are obtained: on the one hand, the core in a passive manner will be cooled from beneath by the fact that the lower surface of the portion is in contact with the cooling medium in the lower space and, on the other hand, a further barrier for the core to be penetrated before it may reach the floor surface of the containment has been provided. Furthermore, if the core anyway would penetrate the portion, the complete floor surface of the containment is available for the core, i.e., the core may be distributed over a large area covered by the cooling medium. Advantageously, the portion may comprise a surface arranged in such a manner that the cooling medium may flow along the surface and remove heat from the portion. In such a manner, one may ensure efficient cooling from beneath of a core which has fallen down at a possible core melt, since the cooling medium flows along the surface and cools it down by natural recirculation.

According to a further embodiment of the invention, the separating member comprises a wall portion extending upwardly from and surrounding the portion in such a manner that the portion and the wall portion form a cavity of the separating member. In such a manner, the core will, in case of a possible core melt, be located in a delimited space and it is also possible to let the wall portion be cooled down from outside by the cooling medium in the lower space. In addition, it is possible to fill up the cavity by water before the melt reaches the portion, enabling the cooling to be further improved.

According to a further embodiment of the invention, an openable connection is provided to extend between the cooling medium in the lower space and the cavity and to enable the supply of the cooling medium to the cavity. In such a manner it is possible to cool down the core not only from beneath through the portion but also by direct supply of cooling medium onto the core. Thereby, the openable connection may comprise a conduit extending through the wall portion. In such a manner, the core may, in addition, be cooled down from above by, for instance, cooling medium flowing down over the core. Furthermore, the openable connection may comprise a fuse portion arranged to fuse at a predetermined temperature and thereby the openable connection. In such a manner, the additional cooling will take effect as soon as a sufficiently high temperature has been reached by the fuse portion. Thereby, the fuse portion may be comprised by the portion, which thus involves the flowing of the cooling medium into the cavity from beneath.

According to a further embodiment of the invention, the lower space comprises a bottom surface formed by the lower limiting wall of the containment, the portion being provided at a distance from the bottom surface, wherein at least one essentially vertical support plate extends between the portion and the bottom surface.

According to a further embodiment of the invention, at least one channel extends through the separating member and connects the upper and lower spaces. The channel has an orifice in the lower space, which is arranged to be located in the cooling medium. By such a channel, possible discharge of steam into the upper space, which may lead to a pressure increase therein, will be conveyed down into the lower space and will be condensed in the cooling medium. According to an advantageous embodiment, the openable connection has an orifice in the cavity, which is provided at a lower level than the orifice of the channel. In such a manner, it is ensured at the pressure of the cooling medium at the openable connection will be sufficiently high to permit the cooling medium to flow through the openable connection and into the cavity, and in such a manner that the core may be cooled down at the same time as the steam from the water above the core may be cooled down by the colder cooling medium in the lower space. In order to ensure, over a longer period of time, an efficient cooling of the core, means may be arranged to cool down the cooling medium in the lower space.

Further features and advantages of the present invention will appear from the following description of different embodiments.

BRIEF DESCRIPTION OF THE DRAWINGS

The present invention will now to be explained more closely by means of embodiments, defined by way of example, and with reference to the drawing attached, in which FIG. 1 discloses a section through a nuclear reactor plant according to the present invention.

DETAILED DESCRIPTION OF DIFFERENT EMBODIMENTS

Figure 1:
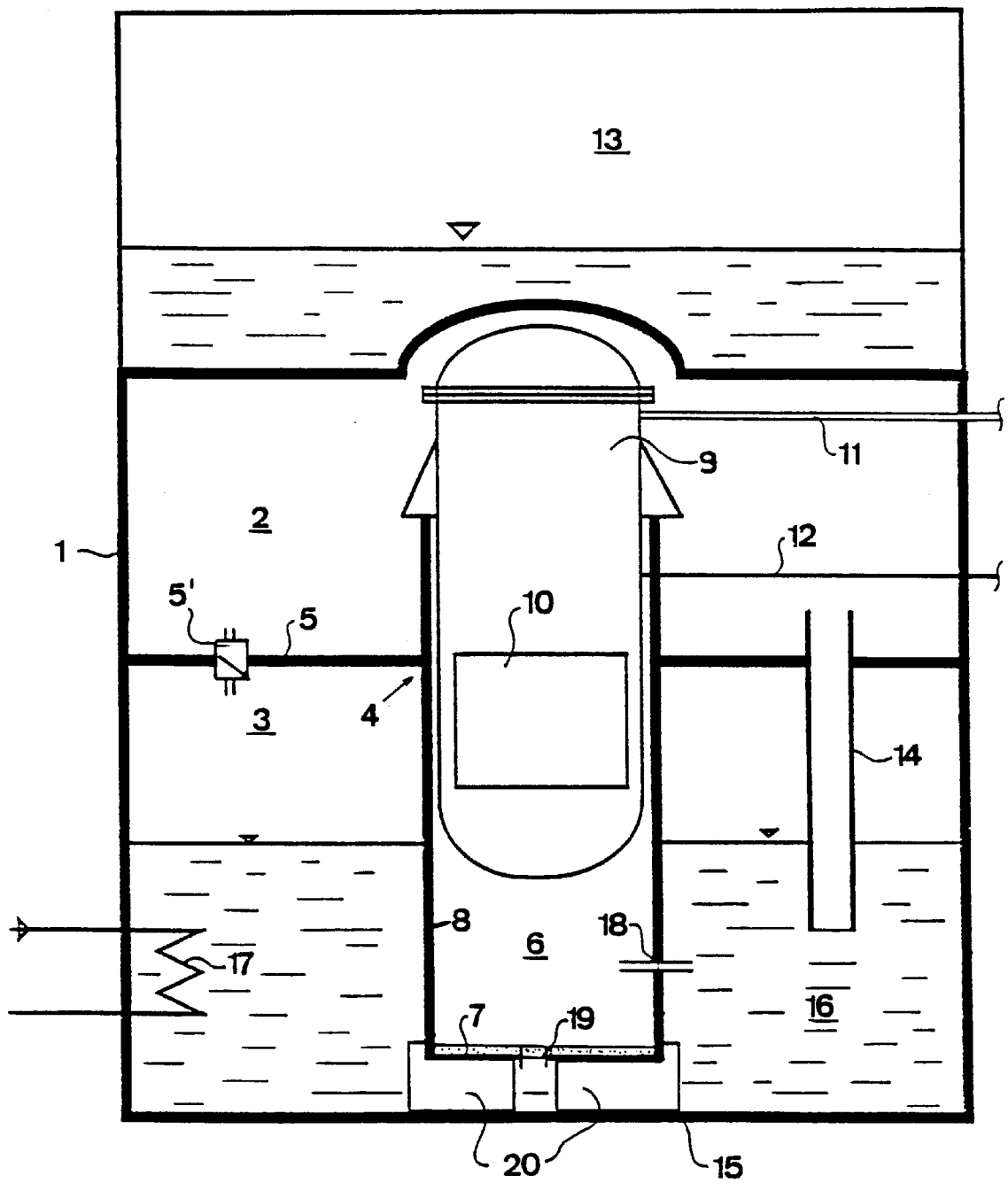

The invention relates to a nuclear reactor plant with a light water reactor, i.e., a reactor which may comprise a boiling water reactor, BWR, or a pressure water reactor, PWR, and which employs water as cooling medium and moderator. FIG. 1 discloses schematically a nuclear reactor plant comprising a containment 1 enclosing an upper space 2 and a lower space 3, which are separated from each other by means of a separating member 4 in the shape of an intermediate wall. The intermediate wall 4 comprises a peripheral, essentially plane, portion and a cavity 6 centrally provided and defined by a lower portion 7 and a wall portion 8 extending around the lower portion 7 and connecting lower portion 7 with the peripheral portion 5.

A reactor vessel 9 is provided in the upper space 2 and in such a manner that it at least partly extends down into the cavity 6. At 10, a reactor core contained in the reactor vessel 9 is schematically disclosed. The reactor plant disclosed is of a so-called boiling water type and comprises a steam conduit 11 extending out of the containment 1 to a turbine plant for generating electrical energy. From the turbine plant, a feed water line 12 extends through the containment 1 and back into the reactor vessel 9. Above the containment 1, there is a further space 13 which is arranged to house different pools, for instance, a pool with water in which the fuel rods may be provided during repair and fuel replacement.

A number of channels 14, so-called blow down pipes are provided between the upper space 2 and the lower space 3. It is to be noted that merely one such channel 14 is disclosed in FIG. 1. The containment 1 comprises a lower limiting wall 15 forming an essentially plane bottom surface of the lower space 3. The lower space 3 is arranged to house a cooling medium 16, such as water. Furthermore, the lower space 3 is arranged to house such an amount of cooling medium 16 that the orifice of the channel 14 in the lower space 3 will be located in the cooling medium 16. Moreover, in FIG. 1 a heat exchanger device 17 is disclosed schematically, which is arranged to be connected to an external cooling circuit for cooling of the cooling medium 16. Furthermore, the plane portion 15 comprises at least one one-way valve 5' which is arranged to open a connection if the pressure in the lower space 3 is higher than the pressure in the upper space 2 in order to equalize the pressure in both the spaces 2 and 3.

Furthermore, in FIG. 1 is disclosed an openable connection 18 in the form of a pipe conduit between the cavity 6 and the lower space 3. The openable connection 18 may comprise a valve member permitting automatic opening at a core melt. The openable connection 18 may also comprise a melt fuse, which at a temperature raised to a predetermined level melts and opens the connection 18. Moreover, an openable connection 19 may be provided in the portion 7, which also may comprise a valve member or a melt fuse melting at a predetermined temperature and opening the connection 19 in such a manner that cooling medium 16 may flow therethrough into the cavity 6. As appears from FIG. 1, in a boiling water reactor, the openable connections 18 and 19 are provided at a lower level than the orifice of the channel 14.

Due to the cooling by the heat exchanger device 17, the pressure in the upper space 2 is somewhat higher than in the lower space 3, compared to the slightly lower liquid level in the channel 14 than in the lower space 3. At a possible steam leakage in the upper space 2, steam will thus be conveyed down through the channel 14 and be condensed in the cooling medium 16. The lower space 3 and the cooling medium 16 present therein consequently form a so-called condensation pool.

The lower portion 7 in the cavity 6 comprises a lower surface which is submerged in the cooling medium 16 and which permits natural flowing of the cooling medium along the surface. Such a flowing may be improved by the surface being, for instance, convex. It may also be essentially plane and slope somewhat in relation to a horizontal plane. Also, other shapes of the surface are possible in order to increase the flow of the cooling medium and thereby the cooling of the portion 7. The lower portion 7 may be manufactured from different types of material. For instance, it may comprise a steel plate, the lower surface of which is positioned in direct contact with the cooling medium 16 in the lower space 3. Thereby, a satisfactory heat transfer between the cavity 6 and the cooling medium 16 is ensured. Furthermore, vertical support plates 20 may be provided between the lower portion 7 and the lower limiting wall 15 of the containment 1. These support plates 20 may, for instance, be provided in a star configuration and extend radially. The purpose of the support plates 20 is, on the one hand, to increase the heat transfer surface from the lower portion 7 and, on the other hand, to form a support for the lower portion 7 and to absorb the forces which may arise at possible steam explosions in the cavity 6. The support plates 20 are designed and positioned in such a manner that they do not hinder the flow of the cooling medium 16 along the lower portion 7.

If the reactor core 10 for any reason would reach a raised temperature and start to melt, and thereby lose its position in the reactor vessel 9 and fall down against and through the bottom of the reactor vessel 9, the core 10 being geometrically changed by this, will be positioned on the lower portion 7. Since the lower portion 7 and the wall portion 8 are cooled from outside by the cooling medium 16, the portion 7 will, at least, during advantageous conditions, passively manner resist the heat developed by the core 10 which has fallen down. The cooling of the core will be improved by the direct supply of cooling medium 16 to the core via the openable connection 18 and/or the openable connection 19. Since the orifice of the channel 14 is located above the connections 18, 19, it is ensured that the pressure of the cooling medium 16 always will overcome the pressure prevailing in the upper space 3 and, in particular, in the cavity 6 in such a manner that the cooling medium 16 will flow in through the connections 18, 19. Furthermore, at a possible core melt, the design of the cavity 6 and its bottom 7 will cause heat from the core, which has fallen down into the cavity, to be transferred to the cooling medium 16 via the bottom 7 in such a manner that the pressure in the lower space 3 increases and becomes higher than the pressure in the upper space 2. However, at the same time the cooling medium will be supplied to the core via the connections 18, 19, for at least as long as the pressure in the lower space 3 is higher than in the upper space 2. The cooling medium which in this manner is supplied to the core which has fallen down will evaporate, which raises the pressure in the upper space 2 in such a manner that blowing down takes place through the channels 14. Consequently, the conditions are not always stable and the gas generated by the core which has fallen down will collect in both spaces 2 and 3 in such a manner that a total pressure reduction is obtained.

If the cooling is not sufficient, the core will, after a while, melt through the lower portion 7 and fall down into the cooling medium 16 in the lower space 3. As shown in FIG. 1, the bottom surface of the lower space 3 has a significantly greater area than the lower portion 7 and thereby the core may spread over a large area onto the bottom surface. During the passage of the melted core through the portion 7, it will be divided and in this manner the cooling effect is increased. Consequently, these factors result in a more efficient cooling of the core by the cooling medium 16 and thereby it is also possible to prevent the core from penetrating the lower limiting wall 15 of the containment 1.

By the arrangement according to the invention, a further barrier at a possible core melt is thus provided. This design may have an essential significance in order to ensure that no radioactivity leaks out into the environment outside the containment 1. It is also to be noted that the arrangement according to the invention relies on completely passive measures, i.e., it does not employ the function of any pumps or other actively driven members in order to ensure the integrity of the containment 1 at a possible core melt.

The present invention is not limited to the embodiment disclosed but may be varied and modified within the scope of the following claims. For instance, it is to be noted that the plant may comprise either one of the openable connections 18 and 19, both of these or no opening at all. It is also possible to provide more opening connections extending around the wall portion 8.

Although the embodiment disclosed refers to a boiling water reactor, it should be noted that the principles according to the invention also are applicable to a so-called pressure water reactor.

What is claimed is:

1. A nuclear reactor plant with a light water reactor, comprising a containment having an upper space and a lower space, which is separated from the upper space by a separating member and which is arranged to house a reservoir of a liquid cooling medium, and a reactor vessel housing a reactor core and located in the upper space, wherein the separating member comprises a portion which has a first surface facing the upper space and a second surface facing the lower space, wherein said portion is arranged at such a position that the second surface of the portion facing the lower space is in contact with said liquid cooling medium during normal operation of the plant, wherein the reactor vessel is provided above said portion, and wherein said second surface is arranged such that said liquid cooling medium may flow by natural recirculation along the second surface to remove heat from said portion.

2. A nuclear reactor plant according to claim 1, wherein the separating member comprises a wall portion extending upwardly from and surrounding said portion in such a manner that said portion and the wall portion form a cavity of the separating member.

3. A nuclear reactor plant according to claim 2, wherein an openable connection is provided to extend between said cooling medium in the lower space and said cavity and to enable the supply of said cooling medium to the cavity.

4. A nuclear reactor plant according to claim 3, wherein the openable connection comprises a conduit extending through the wall portion.

5. A nuclear reactor plant according to claim 3 wherein the openable connection comprises a fuse portion arranged to fuse at a predetermined temperature and thereby open the openable connection.

6. A nuclear reactor plant according to claim 5, wherein said portion comprises the fuse portion.

7. A nuclear reactor plant according to claim 3, wherein the openable connection comprises a valve member.

8. A nuclear reactor plant according to claim 1, wherein the lower space comprises a bottom surface formed by a lower limiting wall of the containment, said portion being provided at a distance from the bottom surface, and wherein at least one essentially vertical support plate extends between said portion and the bottom surface.

9. A nuclear reactor plant according to claim 1, wherein at least one channel extends through the separating member and connects the upper and lower spaces, and wherein said channel has an orifice in the lower space, which is located in said cooling medium.

10. A nuclear reactor plant according to claim 3, wherein the openable connection has an orifice in the cavity, which is provided at a lower level than an orifice of a channel connecting the upper and lower spaces.

11. A nuclear reactor plant according to claim 1, wherein means is arranged to cool down said cooling medium in the lower space.

* * * * *